(12) United States Patent
Hsiao

(10) Patent No.: US 8,577,188 B2
(45) Date of Patent: Nov. 5, 2013

(54) OPTICAL TRANSMITTER MODULE

(75) Inventor: Yu-Chao Hsiao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 244 days.

(21) Appl. No.: 13/274,364

(22) Filed: Oct. 17, 2011

(65) Prior Publication Data

US 2013/0051722 A1 Feb. 28, 2013

(30) Foreign Application Priority Data

Aug. 23, 2011 (TW) .................................. 100130110

(51) Int. Cl.
*G02F 1/01* (2006.01)
(52) U.S. Cl.
USPC ............................................................. 385/1
(58) Field of Classification Search
None
See application file for complete search history.

(56) References Cited

U.S. PATENT DOCUMENTS

| | | | |
|---|---|---|---|
| 6,954,307 B2 * | 10/2005 | Shao | 359/484.04 |
| 6,965,472 B2 * | 11/2005 | Efimov et al. | 359/484.05 |
| 7,376,355 B2 * | 5/2008 | Ota | 398/167 |
| 8,320,415 B2 * | 11/2012 | Starodubov et al. | 372/6 |
| 2002/0015228 A1 * | 2/2002 | Cao et al. | 359/497 |
| 2002/0024730 A1 * | 2/2002 | Ducellier et al. | 359/498 |
| 2005/0207009 A1 * | 9/2005 | Efimov et al. | 359/494 |
| 2013/0084067 A1 * | 4/2013 | Iwamura | 398/48 |

* cited by examiner

Primary Examiner — Sung Pak
(74) Attorney, Agent, or Firm — Altis & Wispro Law Group, Inc.

(57) ABSTRACT

An optical transmitter module includes a light source, a first optical circulation unit, a first optical reflector, and an output unit. The light source emits a first light signal with a first wavelength, and a second light signal with a second wavelength. The first optical circulation unit includes three optical couplers and three optical isolators, which are alternately connected to one another to form a loop. The first optical circulation unit includes a first port at a first optical coupler, a second port at a second optical coupler, and a third port at a third optical coupler. The first port is optically coupled to the light source. The first optical reflector is optically coupled to the second port. The first optical reflector reflects the first light signal back to the second port. The output unit is optically coupled to the third port to output the first light signal.

9 Claims, 2 Drawing Sheets

OPTICAL TRANSMITTER MODULE

BACKGROUND

1. Technical Field

The present disclosure relates to an optical communication system, especially relating to an optical transmitter module.

2. Description of Related Art

An optical communication system usually has an optical transmitter module and an optical receiver module. An optical transmitter module often utilizes kinds of light signals with different wavelength in different channels to communicate with the optical receiver module, thus it is necessary to separate the light signals into different channels. An optical circulator is often used to change the direction of the light signal and achieve multi-directional transmission, thus it is possible to separate different light signals. However, an optical circulator is expensive.

What is needed, therefore, is an optical transmitter module that will overcome the above mentioned shortcomings.

BRIEF DESCRIPTION OF THE DRAWINGS

Many aspects of the present optical transmitter module can be better understood with reference to the following drawings. The components in the drawings are not necessarily drawn to scale, the emphasis instead being placed upon clearly illustrating the principles of the present optical transmitter module and method. Moreover, in the drawings, like reference numerals designate corresponding parts throughout the views.

DETAILED DESCRIPTION

Figure 1:
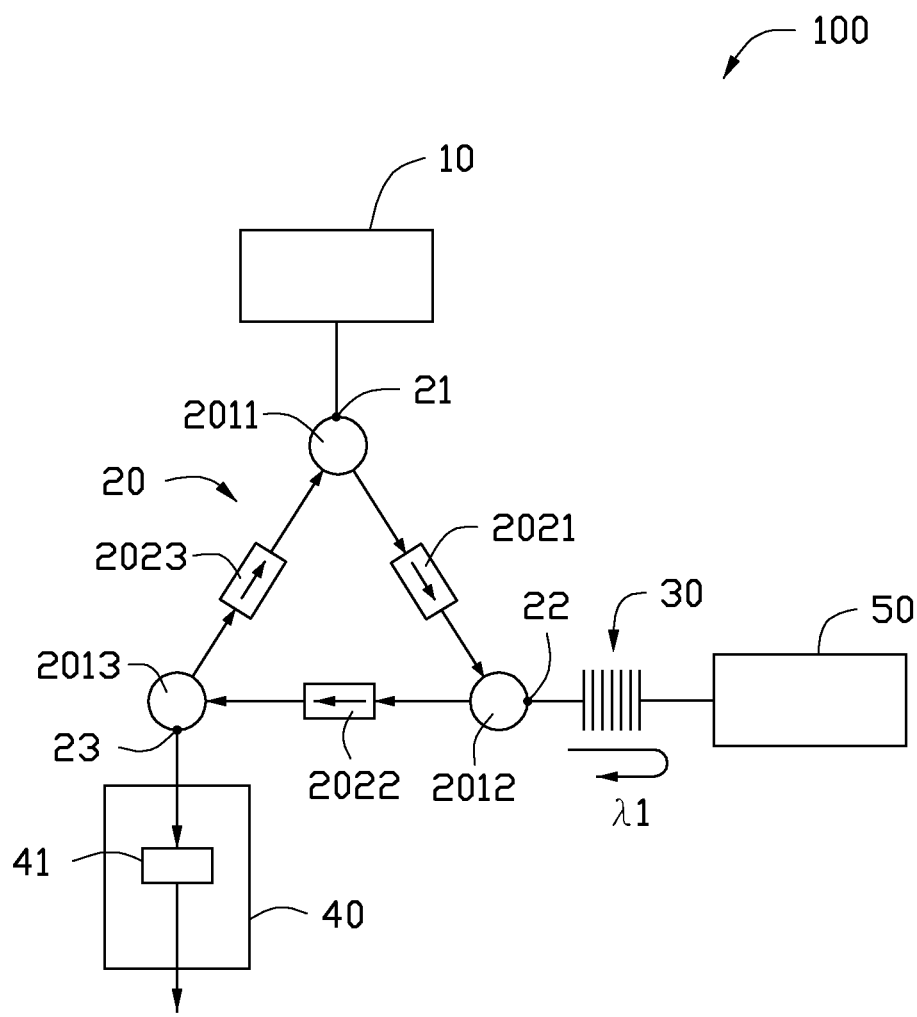
FIG. 1 is a schematic view of an optical transmitter module of a first embodiment of the disclosure.

FIG. 1 shows an optical transmitter module 100 for transmitting optical signals in an optical communication system, including a broadband light source 10 producing light having a plurality of wavelengths, a first optical circulation unit 20, a first optical reflector 30, and an output unit 40.

In this embodiment, the broadband light source 10 provides light in the range of 1520-1570 nanometers, also referred to as the "C-band". The broadband light source 10 transmits light at least having a wavelength $\lambda_1$ in this embodiment.

The first optical circulation unit 20 includes three optical couplers and three optical isolators. The three optical couplers includes a first optical coupler 2011, a second optical coupler 2012, and a third optical coupler 2013. The three optical isolators includes a first optical isolator 2021, a second optical isolator 2022, and a third optical isolator 2023. The first optical circulation unit 20 includes a first port 21 at the first optical coupler 2011, a second port 22 at the second optical coupler 2012, and a third port 23 at the third optical coupler 2013. The first, second, and third optical couplers 2011, 2012, and 2013 are the same in this embodiment. The first, second, and third optical isolators 2021, 2022, and 2023 are also the same in this embodiment.

The three optical couplers 2011, 2012, 2013 and the three optical isolators 2021, 2022, 2023 alternately optically coupled to one another to form a loop. In this embodiment, The first optical coupler 2011, the second coupler 2012, and the third coupler 2013 are optically coupled along clockwise direction. The three optical isolators are also optically coupled along clockwise direction.

The optical couplers 2011, 2012, and 2013 each are used to couple an input optical signal into other port(s). In this embodiment, each optical coupler has three input/output ports, wherein only one input/output port optically coupled to other component not belong to the first optical circulation unit 20 is indicated by a number for convenience, that is, the first port 21, the second port 22, and the third port 23 along clockwise direction.

The three optical isolators 2011, 2012, and 2013 permit light signals to transmit along the direction as indicated by the arrow, and keep the light signals from transmitting counterclockwise. The clockwise direction is the circulation direction of the first optical circulation unit 20 in this embodiment. The first optical circulation 20 may select counterclockwise direction as the circulation direction.

The first optical reflector 30 includes a fiber Bragg grating (FBG) having a corresponding Bragg wavelength $\lambda_1$ and reflecting light signal with substantially the same wavelength as the Bragg wavelength $\lambda 1$.

The broadband light source 10 is optically coupled to the first port 21. The first optical reflector 30 is optically coupled to the second port 22. The output unit 40 is optically coupled to the third port 23. The light signals emitted from the broadband light source 10 are transmitted clockwise sequentially to the first optical coupler 2011, the first optical isolator 2021, the second optical coupler 2012, and output from the second port 22 to the optical reflector 30. The optical reflector 30 reflects the light signal with wavelength $\lambda_1$ back to the second optical coupler 2022 and permits light signal with the other wavelength(s) to pass therethrough. The light signal with wavelength $\lambda_1$ then goes into the second optical isolator 2022, the third optical coupler 2013, and outputs from the third port 23 to the output unit 40. In summery, the light signal inputs the first optical coupler 2011 and outputs from the second optical coupler 2012; the light signal inputs the second optical coupler 2012 and outputs from the third optical coupler 2013; and the light signal inputs the third optical coupler 2013, and outputs from the first optical coupler 2011, while in this embodiment, it is unnecessary to put a light signal into the third port 23. The third optical isolator 2023 blocks the light signals emitted by the broadband light source 10 into the third optical coupler 2013.

The output unit 40 is optically coupled to the third port 23, and is used to output the light signal with wavelength $\lambda 1$ to other component, for example, to an optical receiver module. The output unit 40 may be a port just as the third port 23, or is an output waveguide, or further includes other component, for example, an optical modulator 41 to modulate the light signal. The optical modulator 41 may be electro-absorption modulator or Mach-Zehnder modulator. The output unit 40 may further include a lens to redirect the light signal.

In this embodiment, the optical transmitter module 100 further includes a fourth optical isolator 50 disposed after the first optical reflector 30 to block a reverse flow of light signals passing through the first optical reflector 30 back to the first optical reflector 30.

The optical transmitter module 100 employs inexpensive optical couplers and optical isolators to output light signal with specific predetermined wavelength, thus the cost is lower than conventional optical circulator. Other optical reflector besides the FBG may also be used to reflect specific light signal.

Figure 2:
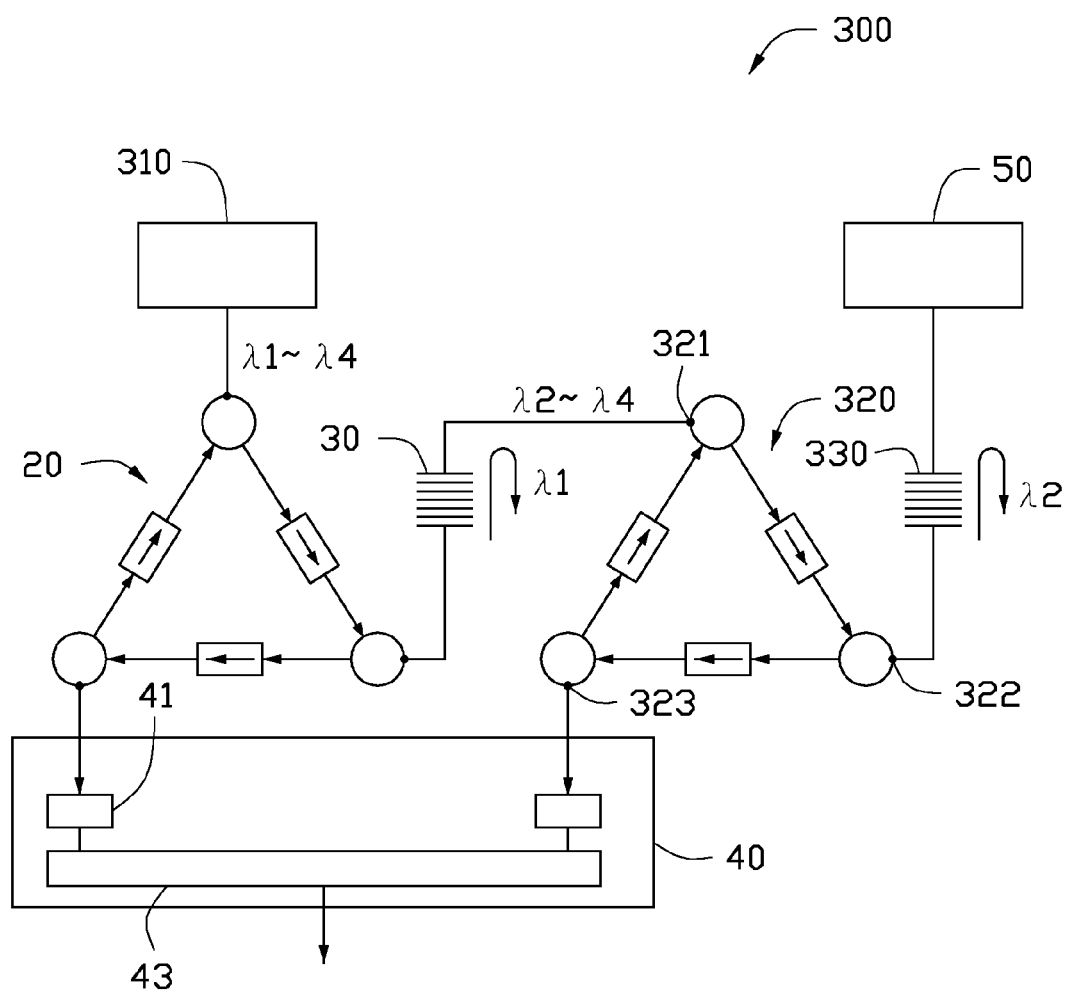
FIG. 2 is a schematic view of an optical transmitter module of a second embodiment of the disclosure.

FIG. 2 shows an optical transmitter module 300 of a second embodiment. The difference between the optical transmitter module 300 and the first optical transmitter module 100 mainly includes: the optical transmitter module 300, a second optical circulation unit 320 and a second optical reflector 330. The light source 310 is a broadband light source producing a plurality of light signals with different wavelengths, for example, from wavelength $\lambda_1$, $\lambda_2$, $\lambda_3$ to wavelength $\lambda_4$.

The second optical circulation unit 320 is similar to the first optical circulation unit 20. The second optical circulation unit 320 has a first port 321, a second port 322, and a third port 323. The first optical reflector 30 is optically coupled to the first port 321 to guide the light signal with wavelength $\lambda 2$, $\lambda 3$, and $\lambda 4$ to the second optical circulation unit 320. The second optical reflector 330 is optically coupled to the second port 322. The second optical reflector 330 includes a FBG reflecting the light signal with wavelength $\lambda 2$, therefore, the light signal with wavelength $\lambda 2$ is output from the output unit 40 by the third port 323. There may be another specialized output unit for the light signal with wavelength $\lambda 2$ output. The output unit 40 may include an optical multiplexer 43 to combine different light signals into one optical fiber.

Similarly, the optical transmitter module 300 may further include some other optical circulation units and optical reflectors to output specific predetermined light signals.

The optical transmitter module 300 further includes a fourth optical isolator 50 at the output port of the second optical reflector 330 to prevent the light signals with wavelength $\lambda 3$ and $\lambda 4$ going back to the second optical circulation unit 330. The fourth optical isolator 50 may be disposed between the first optical reflector 30 and the second optical isolator 320.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. An optical transmitter module comprising:
    a light source for emitting a first light signal with a first wavelength, and a second light signal with a second wavelength;
    a first optical circulation unit comprising three optical couplers and three optical isolators, the optical couplers and the optical isolators alternately connected to one another to form a loop, the three optical couplers comprising a first optical coupler, a second optical coupler, and a third optical coupler, the first optical circulation unit comprising a first port at the first optical coupler, a second port at the second optical coupler, and a third port at the third optical coupler, the first port optically coupled to the light source;
    a first optical reflector optically coupled to the second port, the first optical reflector configured for reflecting the first light signal back to the second port to enter the first optical circulation unit, and allowing the second light signal to pass therethrough; and
    an output unit optically coupled to the third port to output the first light signal.

2. The optical transmitter module of claim 1, wherein the output unit comprises an optical modulator configured for modulating the first light signal.

3. The optical transmitter module of claim 1, further comprising a fourth optical isolator optically coupled to the first optical reflector, for blocking a reverse flow of light signals passing through the first optical reflector back to the first optical reflector.

4. The optical transmitter module of claim 1, wherein the first optical reflector comprises a fiber Bragg grating having a Bragg wavelength equal to the first wavelength.

5. The optical transmitter module of claim 1, further comprising:
    a second similar optical circulation unit, the second optical circulation unit optically coupled to the first optical reflector for circulating the second light signal therethrough, the output unit optically coupled to the second optical circulation; and
    a second optical reflector optically coupled to the second optical circulation unit configured for reflecting the second light signal back to the second optical circulation unit, the second optical circulation unit configured to output the second light signal to the output unit.

6. The optical transmitter module of claim 5, wherein the output unit comprises an optical modulator configured for modulating at least one of the first and second light signals.

7. The optical transmitter module of claim 5, wherein the output unit comprises an optical multiplexer configured to combine the first and second light signals into an optical fiber.

8. The optical transmitter module of claim 5, further comprising a fifth optical isolator optically coupled to the second optical reflector for blocking a reverse flow of light signals passing through the second optical reflector back to the second optical reflector.

9. The optical transmitter module of claim 5, wherein the second optical reflector comprises a fiber Bragg grating having a Bragg wavelength equal to the second wavelength.

* * * * *